United States Patent
Blair et al.

(10) Patent No.: US 7,280,684 B2
(45) Date of Patent: Oct. 9, 2007

(54) METHOD AND SYSTEM FOR ONGOING PERFORMANCE MONITORING OF A CHARACTER RECOGNITION SYSTEM

(75) Inventors: Brian E. Blair, Raleigh, NC (US); Tuyen Q. Bui, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 882 days.

(21) Appl. No.: 10/630,299

(22) Filed: Jul. 30, 2003

(65) Prior Publication Data

US 2005/0025362 A1   Feb. 3, 2005

(51) Int. Cl.
*G06K 9/00*   (2006.01)

(52) U.S. Cl. .............. 382/139; 382/182; 382/186; 382/187; 382/228; 707/5; 707/6; 715/541

(58) Field of Classification Search .......... 382/139, 382/181, 228, 229, 311; 700/108; 702/182
See application file for complete search history.

(56) References Cited

U.S. PATENT DOCUMENTS

| | | |
|---|---|---|
| 5,091,968 A | 2/1992 | Higgins et al. .............. 382/30 |
| 5,243,602 A | 9/1993 | Akagi, Jr. ................ 371/25.1 |
| 5,257,320 A | 10/1993 | Etherington et al. ........... 382/3 |
| 5,493,213 A | 2/1996 | Collins, Jr. et al. ...... 324/158.1 |
| 5,963,659 A * | 10/1999 | Cahill et al. ................ 382/139 |
| 5,970,171 A * | 10/1999 | Baraghimian et al. ...... 382/187 |
| 6,003,027 A * | 12/1999 | Prager ........................... 707/5 |
| 6,243,504 B1 | 6/2001 | Kruppa ...................... 382/318 |
| 6,327,047 B1 | 12/2001 | Motamed .................. 358/1.15 |
| 6,351,553 B1 * | 2/2002 | Hayosh ..................... 382/139 |
| 6,556,883 B2 * | 4/2003 | Iwayama ................... 700/108 |
| 6,963,834 B2 * | 11/2005 | Hartley et al. ............. 704/235 |
| 7,120,302 B1 * | 10/2006 | Billester .................... 382/229 |
| 2002/0054384 A1 | 5/2002 | Motamed .................. 358/504 |
| 2005/0025362 A1 * | 2/2005 | Blair et al. ................ 382/182 |
| 2006/0159345 A1 * | 7/2006 | Clary et al. ................ 382/186 |

FOREIGN PATENT DOCUMENTS

JP   4336853   11/1992

* cited by examiner

*Primary Examiner*—Gregory M Desire
(74) *Attorney, Agent, or Firm*—Sawyer Law Group LLP

(57) ABSTRACT

A method and system for monitoring the performance of a character recognition system is disclosed. According to a preferred embodiment, the method comprises utilizing an average confidence score for a plurality of characters for ongoing performance monitoring of the character recognition system, wherein a confidence score indicates a level of confidence that a character is accurately recognized.

30 Claims, 3 Drawing Sheets

300

METHOD AND SYSTEM FOR ONGOING PERFORMANCE MONITORING OF A CHARACTER RECOGNITION SYSTEM

FIELD OF THE INVENTION

The present invention relates generally to character recognition systems and, more particularly, to a method and system for ongoing performance monitoring of a character recognition system.

BACKGROUND OF THE INVENTION

A character recognition system typically reads one or more characters (numbers or letters) and identifies the characters so that a process involving the characters can be automated. For instance, such a system is commonly used to process a payment check at a point of sale. Here, the check includes a series of special characters located at the bottom of the check which are printed with a magnetic ink. These special characters are known as magnetic ink character recognition (MICR) characters, and were developed by the banking industry to assist in payment check processing and tracking. The MICR characters include such information as bank routing number, customer account number, check sequence number, or other information as specified by individual banks or credit institutions.

The check is passed through the character recognition system, which reads the MICR characters magnetically with a magnetic read head, or optically with an optical scanner, or both. With every pass, loose particles from the check can be deposited on the read head or scanner. In some character recognition systems, a single check is passed through twice, once for the front of the check and once for the back of the check. Over time, dirt, ink and dust from the checks can build up on the read head/scanner and cause the character recognition system to misidentify characters. At this point, the system is error prone and an operator must service the system, e.g., by cleaning the read head/scanner and recalibrating.

Determining when to service the character recognition system is a challenge. Ideally, the system should be cleaned before it becomes error prone. Nevertheless, because the cleaning process is not trivial, it would be burdensome for the operator to clean the system after every use or after every business day.

Currently, the operator can determine when the system needs servicing by passing a test document through the system. The test document usually contains a known pattern, such as a bar code. If the system fails to recognize the test pattern accurately, servicing is needed. While this process helps the operator to determine when servicing is needed, it still requires the operator to pass the test document through the system periodically throughout the business day. Even so, the system's performance can fall below an acceptable level between tests, and the operator might not detect this degradation until after several checks have been incorrectly processed.

Accordingly, a need exists for a system and method that provides ongoing performance monitoring of a character recognition system. The system and method should be automated, i.e. requiring no human intervention, and easily implemented in existing character recognition systems. The present invention addresses such a need.

SUMMARY OF THE INVENTION

The present invention is directed to a method and system for monitoring the performance of a character recognition system. According to a preferred embodiment, the method comprises generating an average confidence score for a plurality of characters recorded on at least one end user document, wherein a confidence score indicates a level of confidence that a character is accurately recognized, and utilizing the average confidence score for ongoing performance monitoring of the character recognition system.

Through the aspects of the present invention, the average confidence score is a running average, i.e., it is recalculated for every new confidence score generated. The average confidence score is compared to a threshold confidence score. The threshold confidence score represents an acceptable, but marginal, level of confidence that a character has been accurately recognized and is determined by the manufacturer of the character recognition system. If the average confidence score falls below the threshold confidence score, an indication for servicing is issued. Accordingly, the present invention automatically warns an operator of a degradation in performance before the system actually fails. Thus, the operator can schedule system maintenance at a convenient time, e.g., during non-business hours. Moreover, the operator is not required to periodically test or monitor the system because the system is self-monitoring.

DETAILED DESCRIPTION

The present invention relates generally to character recognition systems and, more particularly, to a method and system for ongoing performance monitoring of a character recognition system. The following description is presented to enable one of ordinary skill in the art to make and use the invention and is provided in the context of a patent application and its requirements. Although the preferred embodiment of the present invention will be described in a point of sale environment, various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
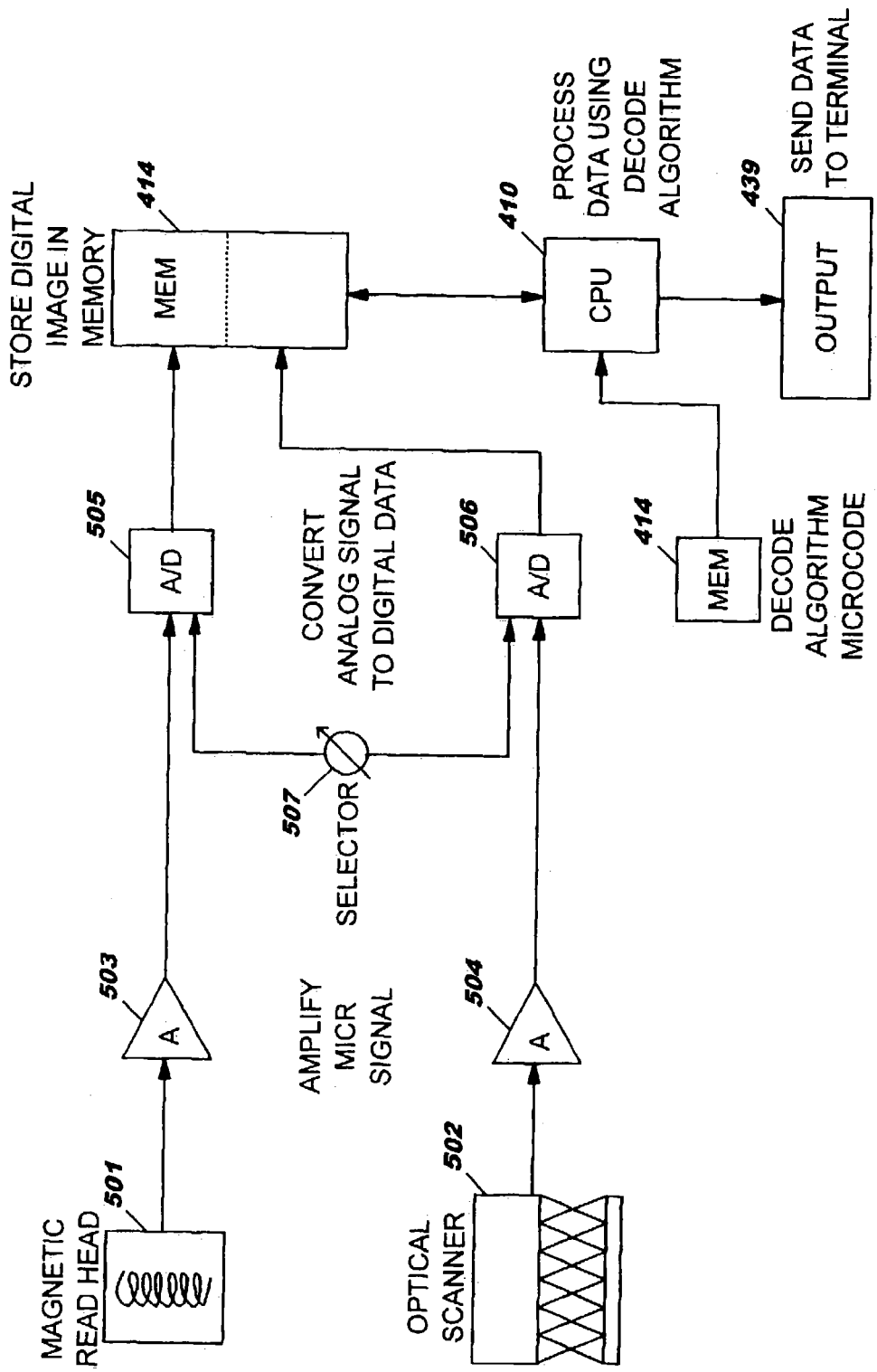
FIG. 1 is a schematic block diagram illustrating a character recognition system that utilizes both, a magnetic read head, as well as an optical scanner.

As stated above, conventional character recognition systems "read" MICR characters magnetically, with a magnetic read head, or optically, with an optical scanner. FIG. 1 is a schematic block diagram illustrating a character recognition system that utilizes both, a magnetic read head, as well as an optical scanner. Such a system is disclosed in a patent issued to Kruppa (U.S. Pat. No. 6,243,504), assigned to the assignee of the present invention. As is shown, signals from the magnetic head 501 and/or optical scanner 502 are amplified and converted from analog signals to digital data. A decoding algorithm executed by a processor 410 decodes the digital data and the resulting decoded data is then sent to a display terminal 439 for further processing.

During the decoding process, the decoding algorithm also calculates a confidence score for each character read. The confidence score represents a level of confidence that a character has been accurately recognized, and can range from zero to 100, 100 being the highest certainty. The confidence score is adversely affected by defects or irregularities in the MICR characters. For instance, the confidence score will fall if the MICR characters do not possess the correct size and/or location on a check. If the confidence score falls below a minimum value, the degree of certainty that the character(s) has been recognized accurately is compromised and an error indicator will result.

It is recognized that for a new character recognition system, i.e., one that is clean, the confidence score is indicative of the quality of the characters on the document. For a large sample of standardized documents, e.g., checks, the quality of such documents is relatively constant. Therefore, an average confidence score for this sample is also relatively constant. For example, over a large number of checks passing through a point of sale, the average confidence score commonly ranges in the mid-to-high ninety level. Accordingly, it is recognized that any significant change in the average confidence score is indicative of the performance of the character recognition system.

In accordance with the present invention, an average confidence score for a plurality of characters in a plurality of documents, e.g., checks, is used to monitor the performance of the character recognition system. This is accomplished by selecting a threshold confidence score that represents a value slightly greater than a minimum level of acceptable performance, and maintaining a rolling average of confidence scores of all characters in a last set number of documents, e.g., the last one hundred documents passed. The last set number of documents should be large enough to provide an adequate statistical sampling of the printing quality of the documents. If the rolling average confidence score falls below the threshold confidence score, the character recognition system indicates to the operator that servicing is required. Because the threshold confidence score is slightly greater than that indicating the minimum level of acceptable performance, the service indication serves as a warning to the operator that performance is degrading. Thus, the operator can arrange for servicing of the system at a convenient time, as opposed to interrupting normal business activities to service the system immediately.

Figure 2:
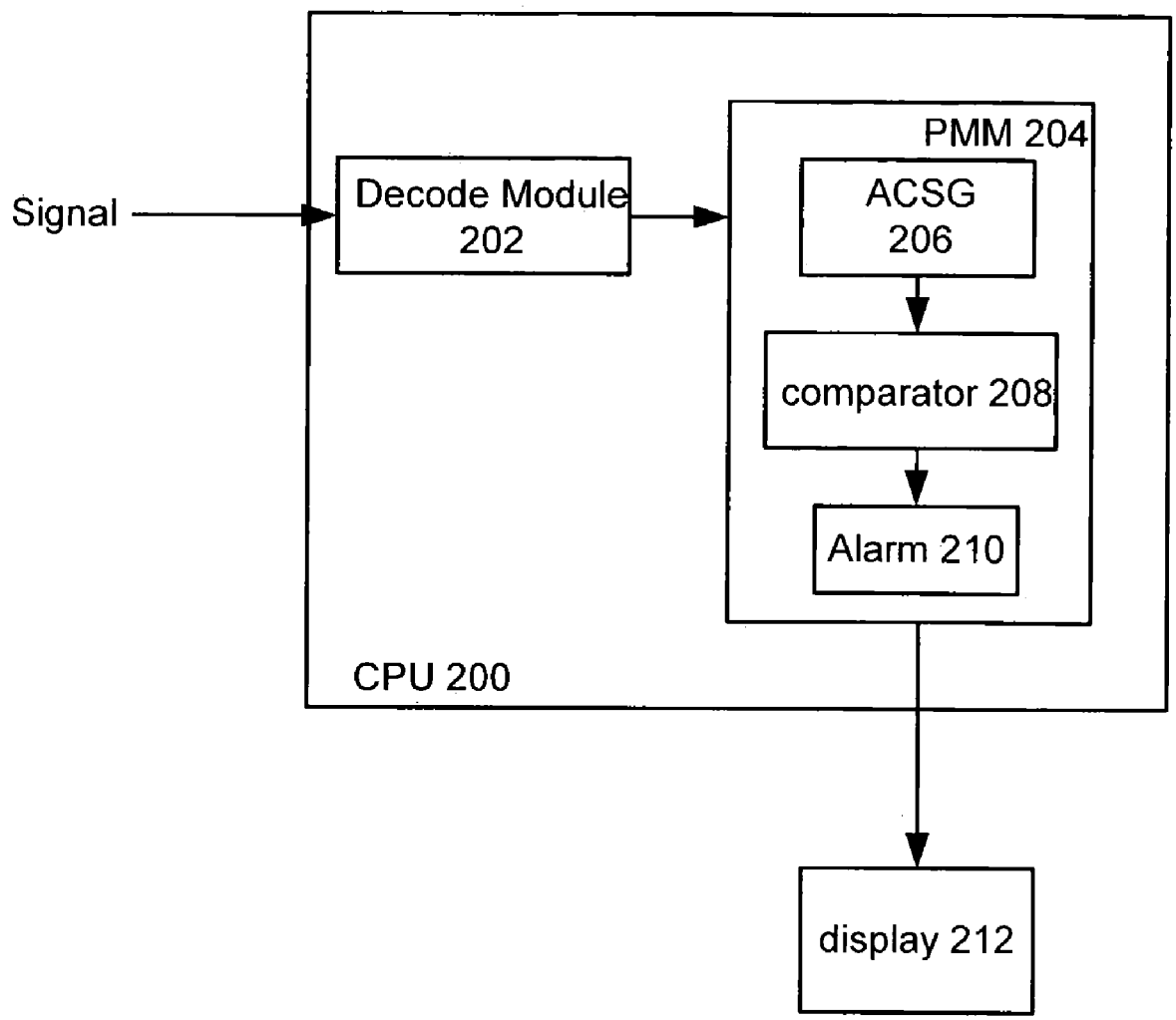
FIG. 2 is a schematic block diagram illustrating the central processing unit (CPU) of the character recognition system according to a preferred embodiment of the present invention.
Figure 3:
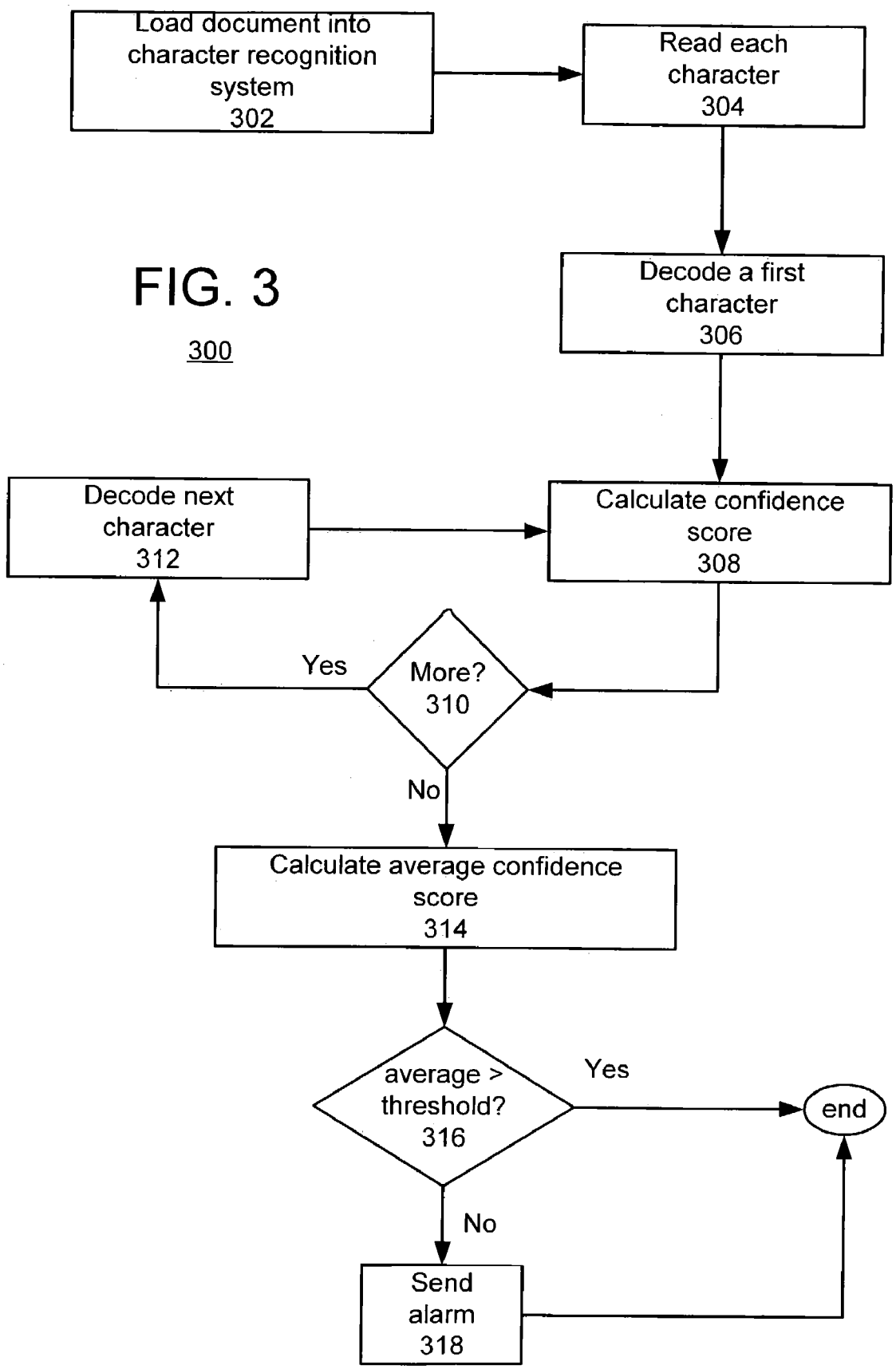
FIG. 3 is a flow chart illustrating the process for performance monitoring of the system according to the preferred embodiment of the present invention.

To describe further the present invention, please refer to FIGS. 1, 2 and 3. FIG. 2 is a schematic block diagram illustrating the central processing unit (CPU) of the character recognition system according to a preferred embodiment of the present invention and FIG. 3 is a flow chart illustrating the process for performance monitoring of the system. The process 300 begins, as before, by loading an end user document into the character recognition system in step 302. An end user document is a document that is processed by the operator during normal use. Thus, for example, in the point of sale case, the end user document is a bank note or check having MICR characters.

Once the document has been loaded, the system reads each character recorded on the document in step 304 via a magnetic read head 501 or optical scanner 502 or both. A signal corresponding to a first character is received by the CPU 200 (FIG. 2), where a decode module 202 executes a decoding algorithm to decode the signal in step 306. The decoding algorithm can be any suitable algorithm, such as that disclosed in U.S. Pat. No. 5,091,968, issued to Higgins, et al. on Feb. 25, 1992. In step 308, the decode module 202 calculates a confidence score for the decoded character. If more characters need to be processed (step 310), the next character is decoded in step 312 and a confidence score for that character is calculated in step 308. This loop is repeated until all characters recorded on the document have been decoded.

According to the preferred embodiment of the present invention, once all characters have been decoded, the decode module 202 passes the corresponding confidence scores to a performance monitoring module (PMM) 204. There, in step 314, an average confidence score generator (ACSG) 206 calculates an average confidence score based on the newly calculated confidence scores and the confidence scores of all characters previously read over a last fixed number of end user documents, e.g., the last one hundred documents read. In another embodiment, the average confidence score can be based on a last fixed number of characters read, e.g., the last 1,000 characters read. Thus, the average confidence score is a rolling average, i.e., the oldest confidence scores are dropped from consideration when new confidence scores are calculated.

In step 316, a comparator 208 compares the average confidence score to a threshold confidence score. As stated above, the threshold confidence score represents a value greater than a minimum level of acceptable performance for the character recognition system, and less than the average confidence score for a brand new (e.g., clean) system. Preferably, the threshold confidence score is determined empirically by the system's manufacturer during development of the character recognition system based on a statistical distribution of average confidence scores read by brand new equipment as contrasted to the threshold required to read any particular character correctly and an associated statistical distribution of confidence scores of characters read on a large number of end user documents.

For example, assume that the minimum expected average confidence score for a brand new system of acceptable quality to ship is 97 on a scale of 100, and that the acceptable score for any character to be accepted is 90. If the average confidence score representing the minimum acceptable performance level is between 93 and 94, the threshold confidence score will be at least 95, but less than 97.

Referring again to FIG. 2, if the average confidence score is greater than the threshold confidence score, then the performance monitoring module 204 is satisfied that the character recognition system is performing well. If the average confidence score falls below the threshold confidence score (in step 316), the performance monitoring module 204 will send an alarm 210 in step 318 to alert the operator that the system will be in need of servicing soon. In a preferred embodiment, the alarm 210 is sent to a display 212 coupled to the character recognition system. Alternatively, the alarm 210 can be an audible signal, such as a beeping sound. In either circumstance, the operator is alerted that the performance of the character recognition system is degraded and that maintenance, e.g., cleaning or replacement of parts, and recalibration, will be required soon. Once the system has been serviced, the average confidence score generator 206 (FIG. 2) should be reset so that the previously calculated average is nullified.

Although the above described performance monitoring system calculates and utilizes an average confidence score, those skilled in the art will readily appreciate that a median confidence score can also be calculated and utilized for ongoing performance monitoring. In addition, although the preferred embodiment describes confidence scores that have been normalized, i.e., range from 0-100, it is recognized that the confidence score can also be a raw recognition score outputted from the character recognition system.

Through aspects of the present invention, degradation in the performance of the character recognition system can be identified and corrected before the system is completely error prone. According to the preferred embodiment of the present invention, ongoing performance monitoring of the character recognition system is achieved by continuously generating an average confidence score for a plurality of characters recorded on at least one end user document, and comparing the average confidence score to a threshold confidence score. In addition, the average confidence score is based on the characters recorded on the actual end user documents. Thus, performance monitoring is ongoing and automated and the operator is not required to interrupt normal transactions to run test patterns or bar codes.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for monitoring performance of a character recognition system, the method comprising:

utilizing an average confidence score generated for a plurality of characters to provide ongoing performance monitoring of the character recognition system, wherein a confidence score indicates a level of confidence that a character is accurately recognized, and utilizing the average confidence score further comprises:

determining a threshold confidence score, wherein the threshold confidence score represents a value greater than a minimum level of acceptable performance for the character recognition system and less than an expected level of performance for a new character recognition system, comparing the average confidence score to the threshold confidence score, and indicating to an operator that the character recognition system is in need of service responsive to the average confidence score falling below the threshold confidence score.

2. The method of claim 1, wherein the plurality of characters is recorded on at least one end user document, and the method further comprises:

generating the average confidence score for the plurality of characters prior to utilizing the average confidence score.

3. The method of claim 2, wherein generating the average confidence score further comprises:

reading one or more characters recorded on an end user document;

calculating a confidence score for each of the one or more characters; and averaging the confidence scores for the one or more characters with confidence scores for all characters previously read over a last set number of end user documents.

4. The method of claim 2, wherein the at least one end user document is a standardized document.

5. The method of claim 4, wherein the standardized document is a bank note or personal check.

6. The method of claim 1, wherein responsive to the average confidence score falling below the threshold confidence score, the method further comprises:

servicing the character recognition system; and resetting the average confidence score.

7. The method of claim 1, wherein at least one of the plurality of characters is a magnetic ink character recognition (MICR) character.

8. The method of claim 1, wherein the character recognition system is one of a magnetic ink character recognition system, an optical character recognition system, or a combined magnetic ink and optical character recognition system.

9. A computer readable medium encoded with a computer program for monitoring performance of a character recognition system, the computer program comprising computer-executable instructions for:

utilizing an average confidence score generated for a plurality of characters to provide ongoing performance monitoring of the character recognition system, wherein a confidence score indicates a level of confidence that a character is accurately recognized, and utilizing the average confidence score further comprises:

determining a threshold confidence score, wherein the threshold confidence score represents a value greater than a minimum level of acceptable performance for the character recognition system and less than an expected level of performance for a new character recognition system, comparing the average confidence score to the threshold confidence score, and indicating to an operator that the character recognition system is in need of service responsive to the average confidence score falling below the threshold confidence score.

10. The computer readable medium of claim 9, wherein the plurality of characters is recorded on at least one end user document, and the computer program further comprises computer-executable instructions for:

generating the average confidence score for the plurality of characters prior to utilizing the average confidence score.

11. The computer readable medium of claim 10, wherein generating the average confidence score further comprises:

reading one or more characters recorded on an end user document;

calculating a confidence score for each of the one or more characters; and averaging the confidence scores for the one or more characters with confidence scores for all characters previously read over a last set number of end user documents.

12. The computer readable medium of claim 10, wherein the at least one end user document is a standardized document.

13. The computer readable medium of claim 12, wherein the standardized document is a bank note or personal check.

14. The computer readable medium of claim 9, wherein responsive to the average confidence score falling below the threshold confidence score, the computer program further comprises computer-executable instructions for:

servicing the character recognition system; and resetting the average confidence score.

15. The computer readable medium of claim 9, wherein at least one of the plurality of characters is a magnetic ink character recognition (MICR) character.

16. The computer readable medium of claim 9, wherein the character recognition system is one of a magnetic ink character recognition system, an optical character recognition system, or a combined magnetic ink and optical character recognition system.

17. A system for monitoring performance of a character recognition system, the system comprising:
a performance monitoring module that utilizes an average confidence score generated for a plurality of characters to provide ongoing performance monitoring of the character recognition system, wherein
a confidence score indicates a level of confidence that a character is accurately recognized, and
the performance monitoring module utilizes the average confidence score by
determining a threshold confidence score, wherein the threshold confidence score represents a value greater than a minimum level of acceptable performance for the character recognition system and less than an expected level of performance for a new character recognition system,
comparing the average confidence score to the threshold confidence score, and
indicating to an operator that the character recognition system is in need of service responsive to the average confidence score falling below the threshold confidence score.

18. The system of claim 17, wherein the plurality of characters is recorded on at least one end user document, and the performance monitoring module further generates the average confidence score for the plurality of characters prior to utilizing the average confidence score.

19. The system of claim 18, further comprising:
means for reading one or more characters recorded on an end user document; and
a decode module that calculates a confidence score for each of the one or more characters,
wherein the performance monitoring module generates the average confidence score by averaging the confidence scores for the one or more characters with confidence scores for all characters previously read over a last set number of end user documents.

20. The system of claim 19, wherein the means for reading the one or more characters comprises one of an optical scanner, a magnetic read head, or a combined optical scanner and magnetic read head.

21. The system of claim 18, wherein the at least one end user document is a standardized document.

22. The system of claim 21, wherein the standardized document is a bank note or personal check.

23. The system of claim 17, wherein at least one of the plurality of characters is a magnetic ink character recognition (MICR) character.

24. A method for monitoring performance of a character recognition system, the method comprising:
utilizing a median confidence score generated for a plurality of characters to provide ongoing performance monitoring of the character recognition system, wherein
a confidence score indicates a level of confidence that a character is accurately recognized, and
utilizing the median confidence score further comprises:
determining a threshold confidence score, wherein the threshold confidence score represents a value greater than a minimum level of acceptable performance for the character recognition system and less than an expected level of performance for a new character recognition system,
comparing the median confidence score to the threshold confidence score, and
indicating to an operator that the character recognition system is in need of service responsive to the median confidence score falling below the threshold confidence score.

25. The method of claim 24, wherein the plurality of characters is recorded on at least one end user document, and the method further comprises:
generating the median confidence score for the plurality of characters prior to utilizing the median confidence score.

26. The method of claim 25, wherein generating the median confidence score further comprises:
reading one or more characters recorded on an end user document;
calculating a confidence score for each of the one or more characters; and
determining the median confidence score from the confidence scores for the one or more characters and confidence scores for all characters previously read over a last set number of end user documents.

27. The method of claim 25, wherein the at least one end user document is a bank note or personal check.

28. The method of claim 24, wherein responsive to the median confidence score falling below the threshold confidence score, the method further comprises:
servicing the character recognition system; and
resetting the median confidence score.

29. The method of claim 24, wherein at least one of the plurality of characters is a magnetic ink character recognition (MICR) character.

30. The method of claim 24, wherein the character recognition system is one of a magnetic ink character recognition system, an optical character recognition system, or a combined magnetic ink and optical character recognition system.

* * * * *